Aug. 4, 1964  M. J. RUDERIAN  3,143,205
FOOD CARRIER
Filed Nov. 20, 1962  2 Sheets-Sheet 1
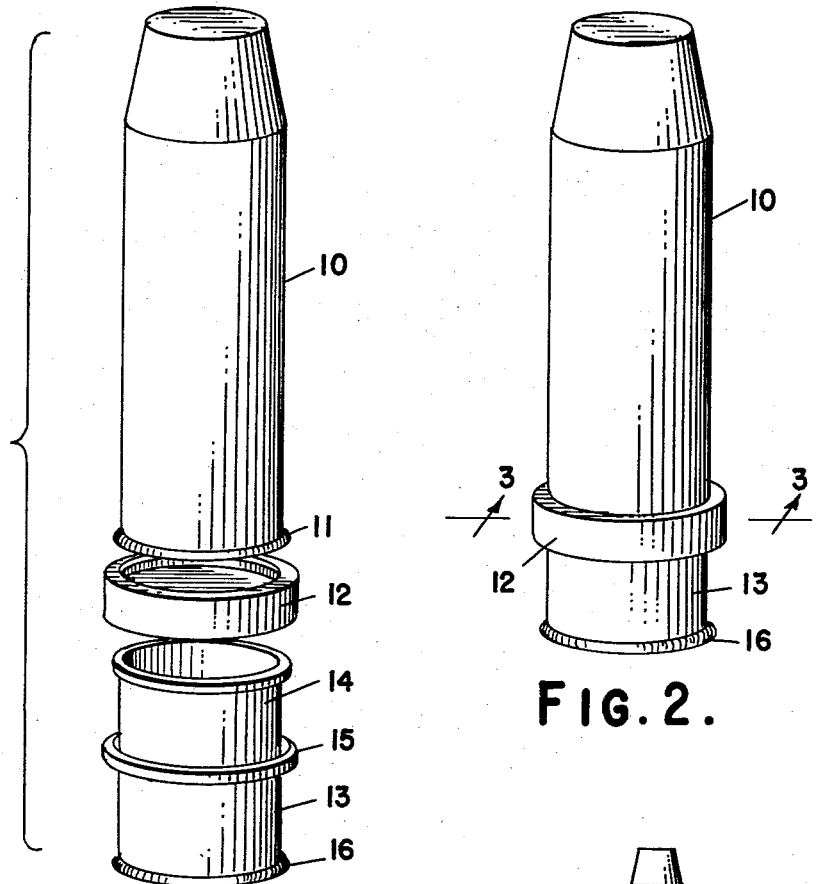
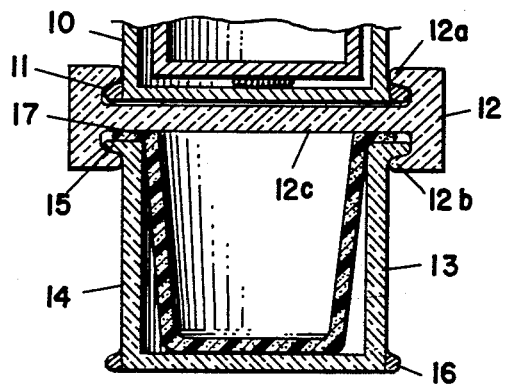
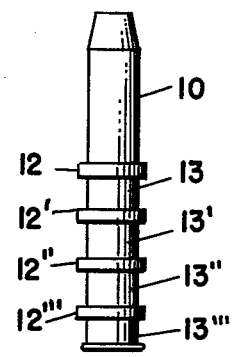
INVENTOR
MAX J. RUDERIAN
BY Elliott & Pastoriza
ATTORNEYS Aug. 4, 1964  M. J. RUDERIAN  3,143,205
FOOD CARRIER
Filed Nov. 20, 1962  2 Sheets-Sheet 2

United States Patent Office 3,143,205
Patented Aug. 4, 1964

3,143,205
FOOD CARRIER
Max J. Ruderian, 545 Hanley, Los Angeles, Calif.
Filed Nov. 20, 1962, Ser. No. 239,871
4 Claims. (Cl. 206—4)

This invention relates generally to food carriers and more particularly to portable compartments and containers for carrying food for use on picnics, as a substitute for children's lunch boxes, and other similar uses.

For convenience and saving of space, it is desirable to have a person's lunch or dinner packaged in one complete unit. Usually, however, a person's lunch includes a beverage as well as solid food matter. Therefore, a thermos is usually required as well as separate sandwich bags or even boxes for transporting other food.

In my United States Patent 2,833,436, there is described a combination thermos bottle assemblage in which the foregoing problem is solved to a considerable extent. In this patent, there is shown a sectionalized container in which various compartments may be connected together for storing more than one type of beverage or if desired for storing various different types of food.

This invention is a continuation-in-part of my co-pending application Serial No. 227,856, filed October 2, 1962, and entitled Food Carrier and constitutes an improvement over the structure shown in my above-mentioned patent.

It is a primary object of the present invention, accordingly, to provide an improved food carrier in which at least two separate compartments are readily securable together so that both beverage and solid food may be carried about in a single unit.

More particularly, it is an object to provide an improved food carrier in which one or more food compartments includes a disposable container structure for actually carrying the food to the end that the cleaning of the carrier itself is greatly simplified.

Still other objects and advantages of this invention are to provide a compartmentalized food carrier which is very easy to assemble and disassemble.

Briefly, these and other objects and advantages of this invention are attained by providing a unique coupling member in combination with a food storage compartment adapted to fit to the end of a conventional thermos type bottle. The storage compartment cooperating with the coupling member may in turn be provided with means for connection to an additional coupling member so that additional similar compartments may be added to the assembly.

In accordance with an important feature of the invention, the various food compartments may include disposable containers for actually receiving the food to the end that no cleaning out of the compartments themselves is required.

The preferred form of the coupling member includes both snap-on and screw type means for connecting the compartments together so that a greatly improved and more easily operated assemblage is provided.

A better understanding of the invention will be had by now referring to preferred embodiments thereof as illustrated in the accompanying drawings, in which:

FIGURE 1 is an exploded perspective view showing various components forming one embodiment of the invention;

FIGURE 2 is another perspective view showing the components in FIGURE 1 in assembled condition;

FIGURE 3 is an enlarged fragmentary cross-sectional view taken in the direction of the arrows 3—3 of FIGURE 2;

FIGURE 4 shows the manner in which a plurality of compartments may be assembled;

Figure 5:
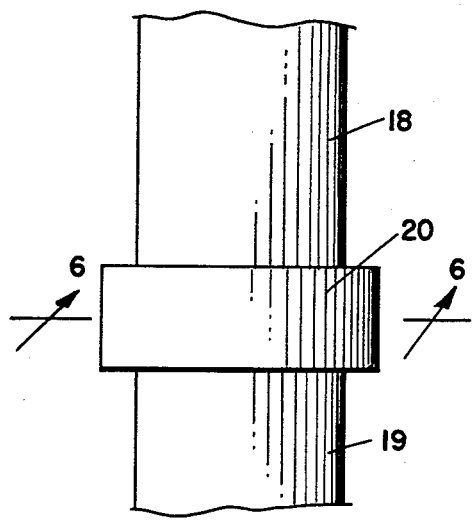
FIGURE 5 is a fragmentary elevational view of a second embodiment of the invention.

Referring first to FIGURE 1, there is shown a conventional thermos bottle 10 constituting a first food or beverage storage compartment terminating at its lower end in an outwardly extending flange defining a first annular exterior bead 11. Below the bead 11 is a coupling member 12 for connecting to the lower end of the thermos 10 a second food storage compartment 13. This compartment 13 may include a disposable container such as indicated at 14 receivable within the compartment 13. The upper end of the compartment 13 terminates in an outwardly extending annular flange defining a second annular bead 15 which is of the same external diameter and size as the first annular bead 11.

The lower end of the second food storage compartment 13 may similarly include an annular bead 16 dimensioned the same as the beads 15 and 11.

With the foregoing arrangement, the inter-coupling member 12 is arranged to snap over the bead 11 at its upper end and snap over the bead 15 at its lower end to hold the various components in assembled relationship as shown in FIGURE 2. This action of the inter-coupling member 12 will be better understood by referring to the enlarged cross section of FIGURE 3.

As shown in FIGURE 3, the coupling member 12 comprises an annular wall terminating at its upper end in an in-turned annular flange 12a and terminating at its lower end an in-turned annular flange 12b. The wall itself includes a transverse partition 12c. The disposable container 14 is shown positioned within the second compartment 13. This disposable container includes an upper annular lip 17 arranged to be sandwiched between the exterior bead 15 and the under side of the partition 12c when the components are assembled. This assembly is accomplished by simply snapping the inwardly turned flanges 12a and 12b over the beads 11 and 15 respectively. Towards this end, the coupling member 12 may be made of a plastic material so as to be readily deformable to the extent required to effect the snapping operation.

The disposable container 14 as shown may be of sufficient wall thickness to provide insulation to keep hot foods hot and cold foods cold. Alternatively, the disposable member 14 may constitute a simple cup and the food storage compartment 13 itself include thermos-like walls to provide the required insulation.

FIGURE 4 illustrates the manner in which a plurality of compartments similar to the compartment 13 may be added to the structure by means of corresponding coupling members. Thus, there are shown additional compartments 13', 13", and 13''' inter-connected by coupling members 12', 12", and 12'''. One or all of these additional compartments may similarly include a disposable container such as the container 14 shown for the compartment 13 in FIGURE 3.

The operation of the food carrier will be evident from the foregoing description. The thermos proper as shown at 10 may be used in a conventional manner to hold hot or cold liquids. The next compartment 13 in turn may be used to hold solid food matter such as potato salad, the disposable container 14 serving as the actual receptacle for the food. Similarly, the additional compartments 13', 13", and 13''' may hold various different types of solid foods.

To remove the food, the user may separate the various compartments at any one of the inter-coupling positions. In this connection, the compartment itself may serve as a reinforcing carrier for the disposable container 14 which, as stated, may be made relatively thin. Thus, the food may be eaten directly from the container and then the disposable container 14 removed from the compartment and disposed of. The compartment may then be reassembled and no appreciable cleaning of the compartment is necessary.

It should be understood, of course, the compartments themselves, as stated, could constitute thermos type structures so that other beverages aside from the beverage stored in the main thermos 10 can be carried.

Figure 6:
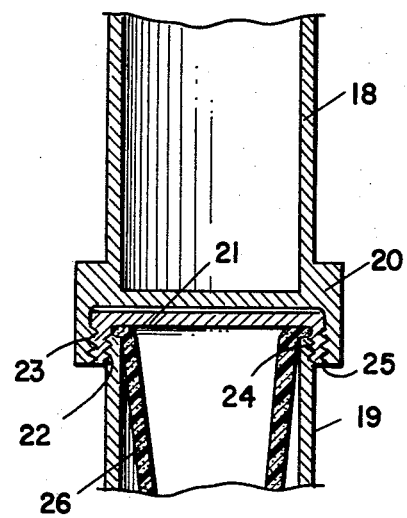
FIGURE 6 is a cross section taken in the direction of the arrows 6—6 of FIGURE 5; and, FIGURE 7 is a cross section of a modification of the embodiment of FIGURE 6.

Referring now to FIGURES 5 and 6, there are shown food compartments 18 and 19 wherein the comparment 18 terminates at its lower end in an enlarged housing 20 for cooperation with a modified inter-coupling member.

With particular reference to FIGURE 6, this modified inter-coupling member is shown at 21 and includes an annular wall having both interior and exterior threads 22 and 23. The interior threads 22 are threadedly received on exterior threads 24 on the upper portion of the lower compartment 19. The exterior threads 23 on the other hand are threadedly received on interior threads 25 formed on the inside of the housing 20.

A disposable container 26 may be provided within the lower compartment 19 as shown.

Figure 7:
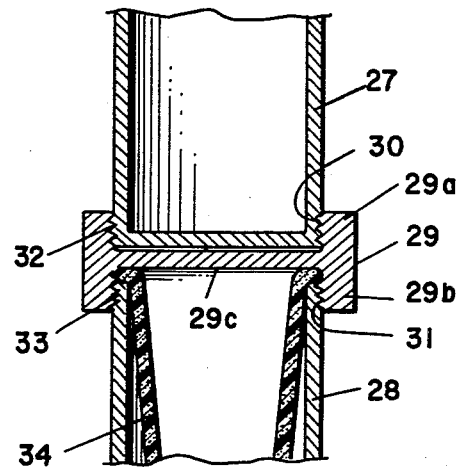

In FIGURE 7, there is shown still another embodiment of the invention wherein compartments 27 and 28 are inter-coupled by an inter-coupling member 29. As shown, the member 29 includes upper and lower annular walls 29a and 29b separated by a partition 29c and interiorly threaded at 30 and 31. The lower and upper ends of the compartments 27 and 28 in turn are threaded at 32 and 33 for respectively receiving the threads 30 and 31.

As in the case of the lower compartment described in FIGURE 6, there may be included a disposable container 34 in the compartment 28 of FIGURE 7.

The operation of the various compartments and inter-coupling members together with the disposable containers described in FIGURES 5, 6, and 7 is identical to that described in conjunction with FIGURES 1-4 except that the compartments are threaded to the inter-coupling members rather than snapped onto the members.

From the foregoing description, it will be evident that the present invention has thus provided a greatly improved food carrier which may be readily assembled and disassembled and which requires substantially no cleaning as a consequence of the use of the disposable containers.

What is claimed is:

1. A food carrier comprising, in combination: a first food storage compartment terminating at its lower end in an outwardly directed annular flange defining a first exterior bead; a second food storage compartment terminating at its upper end in an outwardly directed annular flange defining a second exterior bead; and a coupling member for securing the lower end of said first storage compartment to the upper end of said second food storage compartment, said coupling member comprising an annular wall with a transverse partition, the upper end and lower end of said wall terminating in upper and lower inwardly turned annular flanges adapted to snap over said first exterior bead and said second exterior bead, respectively, said partition functioning as a cover for said second food storage compartment.

2. A food carrier according to claim 1, in which said first food storage compartment constitutes a thermos bottle.

3. A food carrier according to claim 2, including a disposable cup in said second food storage compartment, said cup having an annular lip overlying at least in part said second exterior bead so as to be sandwiched between said bead and said partition when said coupling member is in place.

4. A food carrier according to claim 3, in which the lower end of said second food storage compartment terminates in an outwardly extending annular flange defining an exterior bead similar to said first mentioned exterior bead for receiving the upper end of an additional coupling member whereby additional food storage compartments similar to said second mentioned food storage compartment may me added.

References Cited in the file of this patent
UNITED STATES PATENTS

| | | |
|---|---|---|
| 2,405,764 | Smith | Aug. 13, 1946 |
| 2,833,436 | Ruderian | May 6, 1958 |
| 2,843,281 | Gallois | July 15, 1958 |
| 3,093,238 | King | June 11, 1963 |